United States Patent Office 3,437,673
Patented Apr. 8, 1969

3,437,673
DICARBOXYALKYLIDENE COMPOUNDS CONTAINING HALO SUBSTITUTED BICYCLOALKENE MOIETIES AND DERIVATIVES THEREOF
Louis Schmerling, Riverside, Ill., assignor to Universal Oil Products Company, Des Plaines, Ill., a corporation of Delaware
No Drawing. Filed Aug. 12, 1965, Ser. No. 479,295
Int. Cl. C07d 5/00; C07c 69/00, 61/00
U.S. Cl. 260—346.6                20 Claims

ABSTRACT OF THE DISCLOSURE

Preparation of halo-dicarboxycycloalkylidene acids, corresponding anhydride, methyl or ethyl esters and alkali metal salts thereof said acids having the formulae:

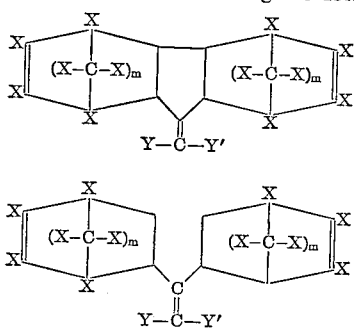

wherein X is chlorine, bromine or hydrogen at least two X's of each ring being chlorine or bromine; Y and Y' are independently selected from the group consisting of carboxy and carboxyalkyl and m is one or two by reacting in the presence of a basic catalyst an alkadiene hydrocarbon having a pair of active hydrogen atoms on a carbon atom with a keto alkanedioic acid and thereafter reacting the resultant compound with two mole proportions of a polyhalo-cyclopentadiene or polyhalo-cyclohexadiene.

---

This invention relates to novel compositions of matter comprising dicarboxyalkylidene compounds containing two polyhalo substituted bicycloalkene moieties and derivatives thereof. More specifically, the invention is directed to these novel compositions of matter and to a method for the preparation thereof.

The increased use of certain polymeric compositions of matter, either naturally occuring or synthetic in origin such as resins, plastics, textiles including rayon, nylon, polyesters, etc., wool, leather, cotton, etc., or other cellulose products such as paper in situations where the finished article is normally subject to excessive heat or the possibility of contact with an open flame necessitates the advisability of having these articles possess the capabilities of being able to withstand the aforementioned effects of heat and/or flame. For example, in recent years, plastics or resins when molded or formed, may be used as receptacles for electrical contacts, electrical appliances and equipment, for architectural paneling and bodies for airplanes, cars, boats, etc., as insulation, etc., and in other places where the possibility of contact with an open flame is present. It is therefore desirable that the finished products either resins, plastics, etc., should possess the desirable physical characteristics of being resistant to flame and retardant to the action of the flame thereon. In order to render the article of commerce resistant or retardant to flame, the article should contain, either as an element thereof or by impregnation therewith, some compound which will impart the aforesaid property of flame retardancy or flame resistance to the specific article. In this respect, it has been found that certain novel compositions of matter comprising the present invention will, when added to certain polyemric substances, impart the desirable property of flame resistance or flame retardance to the aforementioned substances. In addition, it is also contemplated that the novel compositions of matter which are prepared in a manner hereinafter set forth in greater detail may also be utilized as insecticides and in the preparation of other chemical compounds including pharmaceuticals, etc.

In view of this, it is therefore an object of this invention to prepare novel compositions of matter which will impart desirable characteristics to plastics, resins or other polymeric substances.

A further object of this invention is to provide novel compositions of matter which, when utilized as a monomer in the preparation of certain polymeric compounds including plastics, resins, etc., will impart flame retardancy to the finished product.

In a board aspect, one embodiment of this invention is found in a novel composition of matter selected from the group consisting of dicarboxyalkylidene compounds containing two polyhalo substituted bicycloalkene moieties and anhydrides, esters and salts thereof.

A further embodiment of this invention resides in a process for the preparation of a compound selected from the group consisting of dicarboxyalkylidene compounds containing two polyhalo substituted bicycloalkene moieties and anhydrides, esters and salts thereof which comprises condensing an alkadiene with a compound selected from the group consisting of dicarboxylic acids containing carbonyl groups and anhydrides, esters and salts thereof in the presence of a basic catalyst at condensation conditions, thereafter further condensing the resultant compound with a polyhalo substituted cycloalkadiene at condensation conditions and recovering the resultant compound.

Yet another embodiment of this invention is found in a composition of matter comprising the reaction product of a polymer containing at least one reactive functional group and a compound selected from the group consisting of dicarboxyalkylidene compounds containing two polyhalo substituted bicycloalkene moieties and anhydrides, esters and salts thereof.

A specific embodiment of this invention resides in (1,2, 3,4,5,6,7,8,10,10,11,11 - dodecachloro - 1,4,4a,4b,5,8,8a, 9a - octahydro - 1,4,5,8-dimethano-9-fluorenylidene)-succinic anhydride.

Another specific embodiment of this invention is found in a process which comprises condensing cyclopentadiene with diethyl 3-ketoglutarate in the presence of piperidine and sodium hydroxide at a temperature in the range of from about ambient to about 150° C. and at a pressure in the range of from atmospheric to about 50 atmospheres, further condensing one molecular proportion of the resultant diethyl 3 - (cyclopenta - 2,4-dienylidene)glutarate with two molecular proportions of hexachlorocyclopentadiene at a temperature in the range of from about 50° to about 200° C. and at a pressure in the range of from atmospheric to about 50 atmospheres, and recovering diethyl (1,2,3,4,5,6,7,8,10,10,11,11-dodecachloro-1,4,4a,4b, 5,8,8a,9a - octahydro-1,4,5,8-dimethano-9-fluorenylidene) glutarate.

Yet another specific embodiment of this invention is found in a composition of matter comprising the reaction product of a polymer containing at least one reactive functional group and 3 - (1,2,3,4,5,6,7,8,10,1011,11-dodecachloro - 1,4,4a,4b,5,8,8a,9a-octahydro-1,4,5,8-dimethanofluorenylidene)glutaric acid.

Other objects and embodiments will be found in the following further detailed description of this invention.

As hereinbefore set forth, the present invention is concerned with novel compositions of matter as well as to a process for the preparation thereof. In addition, the invention is also concerned with these novel compositions of matter as components in the preparation of resins or plastics whereby certain desirable characteristics such as flame retardancy is imparted in the aforementioned resins or plastics. These novel compositions of matter which comprise dicarboxyalkylidene compounds containing two polyhalo substituted bicycloalkene moieties as well as anhydrides, esters and salts thereof may be prepared by condensing an alkadiene which is characterized by a pair of active hydrogen atoms on a carbon atom with a dicarboxylic acid containing a carbonyl group, and thereafter further condensing the condensation product with a halo substituted cycloalkadiene. For purposes of this invention, the term "alkadiene" which, as hereinbefore set forth is characterized by the presence of a pair of active hydrogen atoms on a carbon atom, as used in the present specification and appended claims will refer to both straight or branched chain alkadienes and cycloalkadienes, the aforementioned alkadienes containing only carbon and hydrogen atoms. Likewise, the term "cycloalkene" as used in the present specification and appended claims will refer to both mono- and polycyclic alkenes.

In the first step of the present invention, suitable alkadienes which may be utilized include 1,4-pentadiene, 1,4-hexadiene, 1,5-hexadiene, 1,4-heptadiene, 1,5-heptadiene, 1,3-cyclopentadiene, 1,3-cyclohexadiene 1,4-cyclohexadiene, etc. Suitable dicarboxylic acids containing a carbonyl group as well as the anhydrides, esters and salts thereof which may be utilized, as starting materials in the process of this invention include ketomalonic acid, dimethyl ketomalonate, diethyl ketomalonate, ketosuccinic acid, ketosuccinic anhydride, dimethyl ketosuccinate, diethyl ketosuccinate, 2-ketoglutaric acid, 3-ketoglutaric acid, 2-ketoglutaric anhydride, 3-ketoglutaric anhydride, dimethyl 2-ketoglutarate, diethyl 2-ketoglutarate, dimethyl 3-ketoglutarate, diethyl 3-ketoglutarate, 2-ketoadipic acid, 3-ketoadpic acid, dimethyl 2-ketoadipate, diethyl 2-ketoadipate, dimethyl 3-ketoadipate, diethyl 3-ketoadipate, 2-ketopimelic acid, 3-ketopimelic acid, 4-ketopimelic acid, dimethyl 2-ketopimelate, diethyl 2-ketopimelate, dimethyl 3-ketopimelate, diethyl 3-ketopimelate, dimethyl 4-ketopimelate, diethyl 4-ketopimelate, 2-ketosuberic acid, 3-ketosuberic acid, 4-ketosuberic acid, 2-ketoazelaic acid, 3-ketoazelaic acid, 4-ketoazelaic acid, 5-ketoazelaic acid, 2-ketosebacic acid, 3-ketosebacic acid, 4-ketosebacic acid, 5-ketosebacic acid, the dimethyl and diethyl esters of the aforementioned ketopimelic acid, ketosuberic acid, ketoazelaic acid, sodium 3-ketoglutarate, ketosebacic acid, potassium 4-ketopimelate, etc.

The condensation process between the aforementioned alkadiene and the dicarboxylic acid containing a carbonyl group or its anhydried, ester or salt is effected at condensation conditions which include a temperature in the range of from about amibent (20° C.) to about 150° C. and at pressures ranging from atmospheric to about 50 atmospheres or more, the pressure which is used being dependent upon the compounds undergoing condensation and which are sufficient to maintain the reactants in a liquid phase. In addition, the condensation is effected in the presence of a basic catalyst. Examples of basic catalysts which may be used include sodium hydroxide, potassium hydroxide, sodium carbonate, potassium carbonate, lithium hydroxide, sodium, sodium alkoxides, lithium carbonate, sodamide, etc.; organic bases such as dimethylamine, triethylamine, tripropylamine, piperidine, pyridine, β-alanine, etc.

The resultant condensation product is then further condensed with a conjugated halo substituted cycloalkadiene in which the preferred halogen substituent comprises chlorine or bormine. Halo substituted cyclodienic compounds which may be used, said compounds containing only carbon, hydrogen and halogen atoms, possess the generic formula:

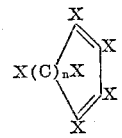

in which the X's are independently selected from the group consisting of hydrogen or halogen radicals having an atomic weight of from 35 to 80 (i.e. chlorine or bromine), at least two of the X's being halogen and $n$ is an integer of from 1 to 2. Representative compounds include 1,2-dichlorocyclopentadiene, 1,2,3-trichlorocyclopentadiene, 1,2,3,4-tetrachlorocyclopentadiene, 1,2,3,4,5-pentachlorocyclopentadiene, hexachlorocyclopentadiene, 1,2,3,4-tetrabromocyclopentadiene, 1,2,3,4,5-pentabromocyclopentadiene, and hexabromocyclopentadiene. It is also contemplated that polyhalo substituted conjugated cyclohexadienes such as 1,2-dichloro-1,3-cyclohexadiene, 1,2,3-trichloro-1,3-cyclohexadiene, octachloro - 1,3 - cyclohexadiene, 1,2-dibromo-1,3-cyclohexadiene, etc., or polyhalo substituted cycloalkadienes which may contain more than one species of halo substituents such as, for example, 1-chloro-2-bromocyclopentadiene, 1,2-dichloro-3-bromocyclopentadiene, 1,2-dichloro-5,5-dibromocyclopentadiene, etc., may also be used. The condensation between the halo substituted cycloalkadiene and the condensation product of the alkadiene and the dicarboxylic acid containing the carbonyl group is effected at temperatures ranging from about 50° to about 200° C. and at a pressure ranging from about atmospheric to about 50 atomspheres or more, the amount of pressure again being that which is required to maintain a major portion of the reactants in the liquid phase. If so desired, this condensation may take place in an inert organic solvent, examples of said solvents including aromatic hydrocarbons such as benzene, toluene, o-xylene, m-xylene, p-xylene, ethylbenzene, etc., straight chain and cyclic paraffins such as n-pentane, n-hexane, n-heptane, cyclopentane, methylcyclopentane, cyclohexane, etc. In addition, the halo substituted cycloalkadiene is present in the condensation reaction in a mole ratio of two moles of conjugated halo substituted cycloalkadiene per mole of the product of condensation between the alkadiene and the dibasic acid, anhydride, ester or salt thereof.

It is also contemplated within the scope of this invention that the condensation product resulting from the reaction of an alkadiene and a dicarboxylic acid containing a carbonyl groups or the anhydride, ester or salt thereof may be condensed with a conjugated alkadiene such as 1,3-butadiene and the resultant product thereafter further condensed with a polyhalo substituted cycloalkadiene to form dicarboxy alkylidene compounds containing two polyhalo substituted tricycloalkene moieties and anhydrides, esters and salts thereof.

The novel compositions of matter of the present invention may be prepared in any suitable manner and may comprise either a batch or continuous type operation. For example, when a batch type operation is used, a quantity of the dienic hydrocarbon either straight chain or cyclic in nature, and the dicarboxylic acid containing a carbonyl group or its anhydride, ester or salt is placed in an appropriate apparatus, preferably a condensation vessel, which is maintained at the proper operating conditions of temperature and pressure. The basic catalyst is added thereto and, if so desired, a substantially inert organic solvent of the type hereinbefore set forth in greater detail. The condensation is allowed to proceed while the water formed during the reaction may be azeotroped off. At the end of the desired time, the condensation product is recovered by conventional means from the solvent and any unreacted starting materials which may still be present. Following this, the thus formed condensation product is placed in a second appropriate reaction vessel along with the halo substituted cycloalkadiene in a mole ratio of one mole proportion of condensation product per two mole proportions of halo substituted cycloalkadiene. A substantially inert solvent may be added thereto and the reaction vessel is heated to the desired operating temperature. At the end of the desired residence time, the reaction product is separated again from the solvent and any unreacted starting materials by conventional means which may include fractional distillation, crystallization, etc., and recovered.

It is also contemplated within the scope of this invention that the process may be effected in a continuous manner. When such a type of operation is used, the starting materials comprising the dienic hydrocarbon and the dicarboxylic acid, anhydride, ester or salt thereof which contains a carbonyl group are continuously charged to a reaction vessel which is maintained at the proper operating conditions of temperature and pressure. This vessel may contain a basic catalyst of the type hereinbefore set forth or such a catalyst may be charged thereto. In addition, if so desired, an organic solvent may also be charged to a reactor through a separate line or admixed through it or both of the starting materials prior to entry into said reactor. Upon completion of the desired operating time, the reactor effluent is continuously withdrawn, the desired condensation product being separated by conventional means from any solvent, water and unreacted starting materials which may be present, the latter being recycled to form a portion of the feed stock. The condensation product which is recovered is then continuously charged to a second reaction zone also maintained at the proper operating conditions of temperature and pressure. Two molecular proportions of halocycloalkadiene per molecular proportion of condensation product are also charged to the second reaction zone along with an organic solvent. After completion of the desired residence time, the reaction effluent from the second reaction zone is continuously withdrawn and separated from any unreacted starting materials and solvent. The desired dicarboxyalkylidene compound containing two polyhalo substituted cycloalkene moieties or its anhydride or ester thereof is charged to storage while the unreacted starting material may be recycled to form a portion of the feed stock.

Examples of novel compositions of matter which may be prepared according to the process of this invention include

[bis(1,4,5,6,7,7-hexabromo-5-norbornen-2-yl)methylene] malonic acid,
[bis(1,4,5,6,7,7-hexachloro-5-norbornen-2-yl)methylene] malonic acid,
dimethyl [bis(1,4,5,6,7,7-hexabromo-5-norbornen-2-yl) malonate,
diethyl [bis(1,4,5,6,7,7-hexabromo-5-norbornen-2-yl) methylene]malonate,
3-[bis(1,4,5,6,7,7-hexabromo-5-norbornen-2-yl)methylene]glutaric acid,
3-[bis(1,4,5,6,7,7-hexachloro-5-norbornen-2-yl)methylene]glutaric acid,
3-[bis(1,4,5,6,7,7-hexabromo-5-norbornen-2-yl)methylene]glutaric anhydride,
dimethyl 3-[bis(1,4,5,6,7,7-hexabromo-5-norbornen-2-yl) methylene]glutarate,
[bis(1,4,5,6,7,7-hexachloro-5-norbornen-2-yl)methylene] succinic acid,
[bis(1,4,5,6,7,7-hexabromo-5-norbornen-2-yl)methylene] succinic acid,
[bis(1,4,5,6,7,7-hexabromo-5-norbornen-2-yl)methylene] succinic anhydride,
dimethyl [bis(1,4,5,6,7,7-hexabromo-5-norbornen-2-yl) methylene]succinate,
(1,2,3,4,5,6,7,8,10,10,11,11-dodecachloro-1,4,4a,4b,5,8,-8a,9a-octahydro-1,4,5,8-dimethano-9-fluorenylidene) succinic acid,
(1,2,3,4,5,6,7,8,10,10,11,11-dodecachloro-1,4,4a,4b,5,8,-8a,9a-octahydro-1,4,5,8-dimethano-9-fluorenylidene) succinic anhydride,
dimethyl (1,2,3,4,5,6,7,8,10,10,11,11-dodecachloro-1,4,4a,4b,5,8,8a,9a-octahydro-1,4,5,8-dimethano-9-fluorenylidene)succinate,
diethyl (1,2,3,4,5,6,7,8,10,10,11,11-dodecachloro-1,4,4a,4b,5,8,8a,9a-octahydro-1,4,5,8-dimethano-9-fluorenylidene)succinate,
3-(1,2,3,4,5,6,7,8,10,10,11,11-dodecachloro-1,4,4a,4b,5,8,-8a,9a-octahydro-1,4,5,8-dimethano-9-fluorenylidene) glutaric acid,
diethyl 3-(1,2,3,4,5,6,7,8,10,10,11,11-dodecachloro-1,4,4a,4b,5,8,8a,9a-octahydro-1,4,5,8-dimethano-9-fluorenylidene)glutarate,
3-(1,2,3,4,5,6,7,8,10,10,11,11-dodecachloro-1,4,4a,4b,5,8,-8a,9a-octahydro-1,4,5,8-dimethano-9-fluorenylidene) adipic acid,
4-(1,2,3,4,5,6,7,8,10,10,11,11-dodecachloro-1,4,4a,4b,5,8,-8a,9a-octahydro-1,4,5,8-dimethano-9-fluorenylidene) pimelic acid,
dimethyl 4-(1,2,3,4,5,6,7,8,10,10,11,11-dodecachloro-1,4,4a,4b,5,8,8a,9a-octahydro-1,4,5,8-dimethano-9-fluorenylidene)suberate,
5-(1,2,3,4,5,6,7,8,10,10,11,11-dodecachloro-1,4,4a,4b,5,8,-8a,9a-octahydro-1,4,5,8-dimethano-9-fluorenylidene-sebacic acid, etc.

It is to be understood that the aforementioned compounds are only representative of the novel compositions of matter and that the present invention is not necessarily limited thereto.

As hereinbefore set forth, the aforementioned dicarboxyalkylidene compounds containing two polyhalo substituted bicycloalkene moieties as well as the anhydride, ester or salt thereof are reacted with certain polymeric compositions of matter containing at least one reactive functional group. An example of these polymeric products comprises epoxy resins which may be cured by the addition of the dicarboxyalkylidene compounds containing two polyhalo substituted bicycloalkene moieties, anhydride, ester or salt thereof. The resins in an uncured state are thermoplastic and may range from low viscosity liquids to high melting point brittle solids. Examples of epoxy resins include the condensation product of epichlorohydrin and bisphenol, epoxidized oils, olefins, etc. The aforementioned acid, anhydride, ester or salt will react with the epoxy resins by condensing with the reactive epoxy or oxirane group present in the molecule to form a cross-linked tridimensional structure. By utilizing the particular dicarboxyalkylidene compounds containing two polyhalo substituted bicycloalkene moieties, anhydride, ester or salt thereof, the resultant product will be stable in regard to color, said stability being of particular advantage when utilizing the resins for certain specific purposes such as floor surfacing, coatings, etc.

Another polymeric product which may be reacted with the acid, anhydride, ester or salt of the type hereinbefore set forth comprises the polyurethanes prepared from prepolymers in which the reactive functional group is an isocyanate end group. The particular prepolymer to be treated with the acid, anhydride, ester or salt will be prepared by reacting a polyester with an excess of an isocyanate such as tolylenediisocyanate, polymethylene polyphenyl isocyanate, diphenylmethane, 4,4½-diisocyanate, p,p-diphenylmethane diisocyanate, etc. The resulting prepolymer will be a linear low molecular weight product. The prepolymer is then cured by reaction with a dicarboxyalkylidene compound containing two polyhalo substituted bicycloalkene moieties, anhydride, ester or salt thereof to form the desired product. The curing of the prepolymer by the addition of the acid, anhydride, ester or salt results in the cross-linking or chain extension of the polymer to give higher molecular weight compounds. These compounds may be prepared in foam form by incorporating a foaming agent such as water, alcohol, etc., during the curing step. This final product will then possess the desired physical properties of the type hereinbefore set forth, that is, a high stability as regards color changes due to deterioration. In addition to being used as a foam, the urethanes may be used as coatings, said coatings having desirable characteristics as compared to other urethanes which have been prepared utilizing other chlorinated cyclic compounds, such characteristics including being fast drying, possessing a hard surface, a deep gloss, a high resistance to abrasion and weathering as well as an excellent resistance to fire. When utilizing these urethanes as coatings of this type, it is necessary in many instances that the coating also have a high resistance to changes in color especially when being exposed to climatic conditions of sun, heat, cold, etc. By utilizing a dicarboxyalkylidene compound of the type set forth in the present invention, the coating will possess fire retardance as well as the necessary physical characteristics and retain the desired color for a longer period of time than will urethane coatings which do not contain this particular acid or anhydride but contain other chlorinated cyclic derivatives.

Yet another example of prepolymers containing an excess of at least one reactive functional group which may be reacted with the dicarboxy alkylidene compound containing two polyhalo substituted bicycloalkene moieties, anhydride, ester or salt thereof comprises polyamides. These polyamides may be prepared by condensing a polyamine with a dibasic acid. Examples of these polyamides would be the condensation of an amine containing more than two functional groups such as diethylenetriamine, dipropylenetriamine, etc., or with a molar excess of a diamine such as ethylenediamine, propylenediamine, etc., with a dibasic acid such as adipic acid, sebacic acid, etc., to form a prepolymer, said prepolymer containing a reactive functional amine group which may then be cross-linked with a dicarboxyalkylidene compound containing two polyhalo substituted bicycloalkene moieties, anhydride, ester or salt thereof. This cross-linking may be done at temperatures ranging from about 200° to about 300° C. or more. The resulting cured or cross-linked polyamide may then be used for molding resins, films, coatings, insulation, etc., the finished product again exhibiting the desired physical properties of being flame resistant and also being resistant to color changes due to the stability of the dicarboxyalkylidene compound, anhydride, ester or salt thereof which is utilized in the preparation as contrasted to other polyamine compounds which contain chlorinated cyclic derivatives.

Another prepolymer which may be cured or cross-linked by the use of the aforementioned acid, anhydride, ester or salt thereof are polyesters which have been formed by the reaction of a dibasic acid, unsaturated in nature, such as maleic acid or terephthalic acid with a molar excess of a glycol, or with a polyhydroxy compound which contains more than two —OH groups such as hexanetriol. The resulting polyester may then be cross-linked utilizing a dicarboxyalkylidene compound or anhydride, ester or salt thereof to form the desired products. For example, polyester resins may be cross-linked with an acid, anhydride, ester or salt of this type to form alkyds which will possess both flame-retardant and color stable properties. In addition to their use as coatings, the cross-linked polyesters may be used for molding and casting polymers which also possess the aforementioned desired physical characteristics.

The prepolymers of the type hereinbefore set forth which contain an excess of at least one reactive functional group, and the dicarboxyalkylidene compound containing two polyhalo substituted bicycloalkene moieties, anhydride, ester or salt thereof may be reacted in any manner known in the art, the reaction conditions such as temperature and pressure being dependent upon the particular compounds undergoing curing or cross-linking. Usually the curing or cross-linking of the prepolymer with the particular acid, anhydride, ester or salt thereof will be effected at temperatures ranging from room temperature (about 20° C.) up to about 300° C. or more. In addition, the acid, anhydride, ester or salt thereof will be present in the finished reaction product in various concentrations, ranging from about 5% to about 50% or more of the finished product, the particular concentration again being dependent upon the particular use to which the finished polymeric product will be put.

The following examples are given to illustrate the process of the present invention; however, they are not intended to limit the generally broad scope of the present invention in strict accordance therewith.

EXAMPLE I

In this example, 20 cc. of piperidine is added during one hour to a well-stirred mixture of 65 g. (1.0 mole) of cyclopentadiene, 148 g. (1.0 mole) of 3-ketoglutaric acid, 80 g. (2.0 moles) of sodium hydroxide and 300 cc. of water. The mixture is then stirred for an additional two hours and is finally heated under reflux for a period of about two hours. At the end of this time, the flask and contents thereof are allowed to cool to room temperature. The desired 3-(cyclopenta-2,4-dienylidene)glutaric acid is liberated by acidifying the aqueous solution (separated from unreacted cyclopentadiene) and is recrystallized. Following this, one molecular proportion of the 3-(cyclopenta-2,4-dienylidene)glutaric acid and two molecular proportions of hexachlorocyclopentadiene dissolved in xylene are placed in a second condensation flask. The flask is then heated to reflux and maintained thereat for a period of about four hours. At the end of this time, the solvent is flashed off and the reaction product is subjected to fractional crystallization. The desired product comprising 3-(1,2,3,4,5,6,7,8,10,10,11,11-dodecachloro-1,4,4a,4b,- 5,8,8a,9a - octahydro-1,4,5,8-dimethano-9-fluorenylidene) glutaric acid is recovered.

EXAMPLE II

In this experiment, a mixture of 194 g. (1.0 mole) of diethyl 3-ketoglutarate, 65 g. (1.0 mole) of cyclopentadiene along with 10 g. of piperidine and 150 cc. of benzene are placed in a flask fitted with a condenser equipped with a trap for removing water. The flask and contents thereof are heated under reflux and maintained thereat for a period of eight hours or until no more water is collected. At the end of this time, the flask and contents thereof are allowed to cool to room temperature, the product is washed with water and dilute acid, dried over potassium carbonate and the solvent is then flashed off. The remaining portion of the reaction mixture is subjected to fractional distillation and the resultant diethyl 3-(cyclopenta-2,4-dienylidene)glutarate is recovered.

One molecular proportion of the glutarate prepared according to the above paragraph along with two molecular proportions of hexachlorocyclopentadiene and a solvent comprising xylene are placed in a condensation flask. The flask is heated to the reflux temperature of xylene and maintained thereat for a period of about four hours. At the end of this time, the solvent is flashed off and the desired product comprising diethyl 3- (1,2,3,4,5,6,7,8,10,10,11,11 - dodecachloro - 1,4,4a,4b,5, 8,8a,9-octahydro - 14,5,8 - dimethano - 9 - fluorenylidene) glutarate is recovered.

EXAMPLE III

To a stirred mixture of 68 g. (1.0 mole) of 1,4-pentadiene, 192 g. (1.0 mole) of sodium 3-ketoglutarate and 300 cc. of ethanol is slowly added a solution of 10 g. sodium ethoxide in 50 cc. of ethanol. The reaction mixture is stirred for a period of about eight hours. At the end of this time, the desired 3-(divinylmethylidene) glutaric acid is recovered by adding water to the product, extracting alkali-insoluble compounds with ether and acidifying the aqueous solution.

One molecular proportion of the glutaric acid derivative prepared according to the above paragraph and two molecular proportions of hexachlorocyclopentadiene along with 100 cc. of toluene are placed in a condensation apparatus which is thereafter heated to reflux. The reaction mixture is maintained at reflux temperature for a period of about four hours, at the end of which time the flask and contents thereof are allowed to cool to room temperature. After flashing off the solvent, the desired reaction product comprising 3-[bis(1,4,5,6,7,7-hexachloro-5-norbornen-2-yl)methylene] glutaric acid is recovered.

EXAMPLE IV

A mixture of 114 g. (1.0 mole) of ketosuccinic anhydride and 65 g. (1.0 mole) of cyclopentadiene which has been dissolved in 100 cc. of benzene is placed in a condensation flask along with 10 cc. of triethylamine. The flask and contents thereof are then heated to reflux temperature and maintained thereat for a period of about eight hours, evolved water being collected in an overhead trap. At the end of this time, the flask and contents thereof are allowed to cool to room temperature and the desired product comprising cyclopenta-2,4-dienylidenesuccinic anhydride is separated and recovered.

One molecular proportion of the anhydride derivative prepared according to the above paragraph along with two molecular proportions of hexachlorocyclopentadiene and 100 cc. of benzene are placed in a condensation flask and heated to reflux. At the end of four hours, the flask and contents thereof are cooled to room temperature and the desired product comprising (1,2,3,4,5,6,7,8,10,10,11,11 - dodecachloro - 1,4,4a,4b,5,8,8a,9a-octahydro - 1,4,5,8 - dimethano - 9 - fluoroenylidene) succinic anhydride is recovered by conventional means.

EXAMPLE V

A mixture of 68. g. (1.0 mole) of 14-pentadiene and 118 g. (1.0 mole) of 4-ketopimelic acid along with 100 cc. of pyridine is condensed by heating on a steambath under a reflux condenser for four hours. Upon completion of the desired residence time, the resultant divinylmethylene-pimelic acid is separated and recovered. One molecular proportion of this pimelic acid derivative and two molecular proportions of hexabromocyclopentadiene along with 100 cc. of xylene is further condensed in a manner similar to that set forth in the above examples. At the end of the desired residence time, the resultant 4-[bis(1,4,5,6,7,7-hexabromo-5-norbornen-2-yl)methylene] pimelic acid is separated and recovered.

EXAMPLE VI

A polyester resin is prepared by charging propylene glycol to the reaction vessel and heating said glycol to a temperature of about 125° C. The adduct comprising 3 - (1,2,3,4,5,6,7,8,10,10,11,11 - dodecachloro - 1,4,4a,4b,5,8,8a,9a- - octahydro - 1,4,5,8 - dimethano-9-fluorenylidene)-glutaric acid which is prepared according to the process set forth in Example I above is gradually charged to the reaction vessel which is maintained at the temperature of 100° C. Upon completion of the addition of the adduct, the flask and contents thereof are then heated to a temperature of 160° C. and maintained thereat for a period of about eight hours. Following this, maleic anhydride is added to the reaction vessel and the vessel again maintained at a temperature of about 165° C. for an additional period of eight hours. At the end of this time, the resin which is formed is recovered by pouring the same onto an aluminum foil. The solid resin will be ignited with difficulty on a Bunsen burner and will be self-extinguishing as soon as it is removed from the flame.

EXAMPLE VII

Another polymer such as an alkyd resin may be prepared by admixing 3-[bis(1,4,5,6,7,7-hexachloro-5-norbornen-2-yl)methylene] glutaric acid with glycerol, phthalic anhydride and linseed oil to form an extended alkyd resin. The resin thus formed can be used as an intermediate in paints and varnishes to impart a finish to objects, which has a high hardness and gloss, and which is water and alkali resistant. In addition, the finished product will also have excellent flame retardant properties.

Other plastics which may be prepared include polyurethane resins and foams in which the compound such as (1,2,3,4,5,6,7,8,10,10,11,11 - dodecachloro - 1,4,4a,4b, 5,8,8a,9a - octahydro - 14,5,8 - dimethano - 9 - fluorenylidene)-succinic anhydride is reacted with a polyol such as 1,2,6-hexatriol. The resulting product is then admixed with toluene-2,4-diiosocyanate to form a rigid white composition of matter which will be self-extinguishing when removed from direct contact with a flame.

I claim as my invention:

1. 3-(1,2,3,4,5,6,7,8,10,10,11,11-dodecachloro - 1,4,4a, 4b,5,8,8a,9a-octahydro-1,4,5,8-dimethano - 9 - fluorenylidene)-glutaric acid.

2. Diethyl 3-(1,2,3,4,5,6,7,8,10,10,11,11-dodecachloro-1,4,4a,4b,5,8,8a,9a - octahydro-1,4,5,8-dimethano-9-fluorenylidene) glutarate.

3. 3-[bis(1,4,5,6,7,7-hexachloro - 5 - norbornen-2-yl)-methylene]glutaric acid.

4. (1,2,3,4,5,6,7,8,10,10,11,11 - dodecachloro - 1,4,4a, 4b,5,8,8a,9a-octahydro-1,4,5,8-dimethano - 9 - fluorenylidene)succinic anhydride.

5. 4-[bis(1,4,5,6,7,7-hexabromo - 5 - norbornen-2-yl) methylene]pimelic acid.

6. A process which comprises condensing cyclopentadiene with sodium 3-ketoglutarate in the presence of piperidine at a temperature in the range of from about ambient to about 150° C. and at a pressure in the range of from atmospheric to about 50 atmospheres, further condensing one molecular proportion of the resultant 3-(cyclopenta-2,4-dienylidene)glutaric acid with two molecular proportions of hexachlorocyclopentadiene at a temperature in the range of from about 50° to about 200° C. and at a pressure in the range of from atmospheric to about 50 atmospheres, and recovering the resultant 3-(1,2,3,4,5,6,7,8,10,10,11,11-dodecachloro - 1,4,4a,4b,5, 8,8a,9a-octahydro-1,4,5,8-dimethano - 9 - fluorenylidene) glutaric acid.

7. A process which comprises condensing cyclopentadiene with diethyl 3-ketoglutarate in the presence of piperidine at a temperature in the range of from ambient to about 150° C. and at a pressure in the range of from atmospheric to about 50 atmospheres, further condensing one molecular proportion of the resultant diethyl 3-(cyclopenta-2,4-dienylidene)glutarate with two molecular proportions of hexachlorocyclopentadiene at a temperature in the range of from about 50° to about 200° C. and at a pressure in the range of from atmospheric to about 50 atmospheres, and recovering the resultant diethyl 3-(1,2, 3,4,5,6,7,8,10,10,11,11-dodecachloro - 1,4,4a,4b,5,8,8a,9a-octahydro-1,4,5,8-dimethano-2-fluorenylidene)glutarate.

8. A process which comprises condensing 1,4-pentadiene with sodium 3-ketoglutarate in the presence of sodium ethoxide at a temperature in the range of from about ambient to about 150° C. and at a pressure in the range of from atmospheric to about 50 atmospheres, further condensing one molecular proportion of the resultant 3-(divinylmethylidene)glutaric acid with two molecular proportions of hexachlorocyclopentadiene at a temperature in the range of from about 50° to about 200° C. and at a pressure in the range of from atmospheric to about 50 atmospheres, and recovering the resultant 3-[bis(1,4,5,6,7,7-hexachloro - 5 - norbornen-2-yl)methylene]glutaric acid.

9. A process which comprises condensing cyclopentadiene with ketosuccinic anhydride in the presence of triethylamine at a temperature in the range of from about ambient to about 150° C. and at a pressure in the range of from atmospheric to about 50 atmospheres, further condensing one molecular proportion of the resultant cyclopenta-2,4-dienylidenesuccinic anhydride with two molecular proportions of hexachlorocyclopentadiene at a temperature in the range of from about 50° to about 200° C. and at a pressure in the range of from atmospheric to about 50 atmospheres, and recovering the resultant (1,2,3,4,5,6,7,8,10,10,11,11-dodecachloro - 1,4,4a,4b,5,8, 8a,9a-octahydro-1,4,5,8-dimethano - 2 - fluorenylidene) succinic anhydride.

10. A process which comprises condensing 1,4-pentadiene with 4-ketopimelic acid in the presence of piperidine at a temperature in the range of from about ambient to about 150° C. and at a pressure in the range of from atmospheric to about 50 atmospheres, further condensing one molecular proportion of the resultant divinylmethylenepimelic acid with two molecular proportions of hexabromocyclopentadiene at a temperature in the range of from about 50° to about 200° C. and at a pressure in the range of from atmospheric to about 50 atmospheres, and recovering the resultant 4-[bis(1,4,5,6,7,7-hexabromo-5-norbornen-2-yl)methylene]malonic acid.

11. The process of claim 20 further characterized in that said dicarboxylic compound is the acid.

12. The process of claim 20 further characterized in that said dicarboxylic compound is the acid anhydride.

13. The process of claim 20 further characterized in that said dicarboxylic compound is the methyl or ethyl ester of the acid.

14. The process of claim 20 further characterized in that said dicarboxylic compound is an alkali metal salt of the acid.

15. A compound selected from the group consisting of dicarboxyalkylidene acid, corresponding anhydride, methyl or ethyl ester and alkali metal salt thereof, said acid having the formula:

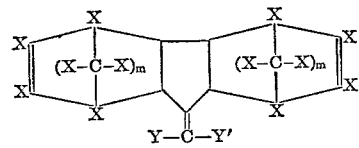

(I)

or

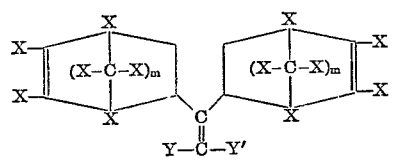

(II)

wherein X is chlorine, bromine or hydrogen, at least two X's of each ring being chlorine or bromine; Y and Y' are independently selected from the group consisting of carboxy and carboxyalkyl, the total number of carbon atoms in Y and Y' being from 2 to about 9; and $m$ is 1 or 2.

16. The dicarboxyalkylidene acid of claim 15.

17. The anhydride of the dicarboxyalkylidene acid of claim 15.

18. The methyl or ethyl ester of the dicarboxyalkylidene acid of claim 15.

19. An alkali metal salt of the dicarboxyalkylidene acid of claim 15.

20. A process which comprises condensing, at a temperature of about 20° to about 150° C. and in the presence of a basic catalyst, an alkadiene hydrocarbon selected from the group consisting of aliphatic alkadienes containing from 5 to 7 carbon atoms and having a pair of active hydrogen atoms on a carbon atom and cycloalkadienes containing 5 or 6 carbon atoms in the ring with a dicarboxylic acid compound selected from the group consisting of ketoalkanedioic acids having one carbonyl and two carboxyl groups and containing up to about 10 carbon atoms, corresponding anhydride, lower alkyl ester and alkali metal salt thereof, thereafter further condensing one mole proportion of the resultant compound at a temperature of about 50° to about 200° C. with two mole proportions of a polyhalo-substituted cycloalkadiene having the formula

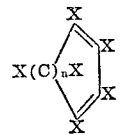

wherein X is chlorine, bromine or hydrogen, at least two X's being chlorine or bromine, and $n$ is 1 or 2, and recovering the resultant compound.

References Cited

UNITED STATES PATENTS 3,371,101  2/1968  Bloch _____ 260—346.6

ALEX MAZEL, *Primary Examiner.*

B. I. DENTZ, *Assistant Examiner.*

U.S. Cl. X.R.

260—31.8, 346.3, 468, 514, 999